United States Patent
Suciu et al.

(10) Patent No.: US 10,428,740 B2
(45) Date of Patent: Oct. 1, 2019

(54) TWIN SHAFTS DRIVING ADJACENT FANS FOR AIRCRAFT PROPULSION

(71) Applicant: UNITED TECHNOLOGIES CORPORATION, Farmington, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 334 days.

(21) Appl. No.: 15/373,072

(22) Filed: Dec. 8, 2016

(65) Prior Publication Data
US 2018/0163633 A1 Jun. 14, 2018

(51) Int. Cl.
*F02C 7/36* (2006.01)
*B64D 27/16* (2006.01)
*B64D 27/00* (2006.01)
*B64D 27/14* (2006.01)
*B64D 35/00* (2006.01)
*F02K 3/04* (2006.01)
*B64D 33/02* (2006.01)

(52) U.S. Cl.
CPC ............... *F02C 7/36* (2013.01); *B64D 27/00* (2013.01); *B64D 27/14* (2013.01); *B64D 27/16* (2013.01); *B64D 35/00* (2013.01); *F02K 3/04* (2013.01); *B64D 2033/0293* (2013.01); *F05D 2220/323* (2013.01); *F05D 2250/312* (2013.01); *F05D 2250/313* (2013.01); *F05D 2250/314* (2013.01); *F05D 2260/40* (2013.01)

(58) Field of Classification Search
CPC .. F02C 7/36; F02K 3/04; B64D 27/14; B64D 35/00; B64D 27/00; B64D 27/16; B64D 2033/0293; F05D 2250/313; F05D 2220/323; F05D 2250/314; F05D 2260/40; F05D 2250/312
See application file for complete search history.

(56) References Cited

U.S. PATENT DOCUMENTS

| | | | |
|---|---|---|---|
| 6,339,927 B1 * | 1/2002 | DiPietro, Jr. | ........... F02C 3/067 60/226.1 |
| 2009/0120058 A1 | 5/2009 | Suciu | |
| 2015/0274306 A1 * | 10/2015 | Sheridan | ................... F02C 7/36 60/772 |
| 2015/0361900 A1 | 12/2015 | Suciu | |

* cited by examiner

*Primary Examiner* — Jacob M Amick
*Assistant Examiner* — Charles Brauch
(74) *Attorney, Agent, or Firm* — Carlson, Gaskey & Olds, P.C.

(57) ABSTRACT

A propulsion system for an aircraft has at least two fans with each fan having a fan drive shaft. A turboshaft gas turbine engine drives each of the at least two fans. The turboshaft engine drives an output shaft which drives a gear to, in turn, engage to drive a gear on a first intermediate shaft extending from the turboshaft gas turbine engine in a rearward direction toward an intermediate fan drive shaft. The intermediate fan drive shaft drives the fan drive shaft, and the at least two first intermediate drive shafts extending over a distance that is greater in an axial dimension defined between the turboshaft gas turbine engine and the fan than it is in a width dimension defined between the at least two fans.

20 Claims, 4 Drawing Sheets

TWIN SHAFTS DRIVING ADJACENT FANS FOR AIRCRAFT PROPULSION

STATEMENT REGARDING FEDERALLY SPONSORED RESEARCH OR DEVELOPMENT

This invention was made with government support under Contract No. NND15AC56C awarded by NASA. The Government has certain rights in this invention.

BACKGROUND OF THE INVENTION

This application relates to the provision of a twin fan propulsion system for aircraft application.

Gas turbine engines are known for providing propulsion to aircraft. Typically, a fan delivers air into a bypass duct as propulsion air. The fan also delivers air into a compressor where it is compressed and then delivered into a combustor. In the combustor, the compressed air is mixed with fuel and ignited. Products of this combustion pass downstream over a turbine section driving turbine rotors to rotate. The turbine rotors, in turn, drive the compressor and fan rotor.

Recently, advanced aircraft applications have been proposed wherein fans are mounted separately from a gas generator core engine which provides drive to the fans. The fans may be made relatively large and provide a good deal of additional propulsion as they are not the source of air being delivered into the compressor.

However, drive systems for such remotely mounted fans have not been fully developed.

SUMMARY OF THE INVENTION

In a featured embodiment, a propulsion system for an aircraft has at least two fans with each fan having a fan drive shaft. A turboshaft gas turbine engine drives each of the at least two fans. The turboshaft engine drives an output shaft which drives a gear to, in turn, engage to drive a gear on a first intermediate shaft extending from the turboshaft gas turbine engine in a rearward direction toward an intermediate fan drive shaft. The intermediate fan drive shaft drives the fan drive shaft, and the at least two first intermediate drive shafts extending over a distance that is greater in an axial dimension defined between the turboshaft gas turbine engine and the fan than it is in a width dimension defined between the at least two fans.

In another embodiment according to the previous embodiment, the output shafts extend from the turboshaft gas turbine engines in a rearward direction to drive the first intermediate drive shafts.

In another embodiment according to any of the previous embodiments, the output shafts extend from the turboshaft gas turbine engines in a forward direction to drive the gear and, in turn, drives the first intermediate drive shafts.

In another embodiment according to any of the previous embodiments, the intermediate fan drive shaft extends for a greater distance in the width dimension than in the axial direction and the fan drive shaft extending for a greater distance in the axial direction than in the width direction.

In another embodiment according to any of the previous embodiments, the first intermediate drive shaft and the fan drive shaft extend parallel to an axis of rotation of the at least two fans.

In another embodiment according to any of the previous embodiments, the intermediate fan drive shaft extends perpendicularly to the axis of rotation of the at least two fans.

In another embodiment according to any of the previous embodiments, a central axis of the turboshaft gas turbine engine is parallel to an axis of rotation of the at least two fans.

In another embodiment according to any of the previous embodiments, a central axis of each the turboshaft gas turbine engines is non-parallel to the axis of rotation of the fan rotors.

In another embodiment according to any of the previous embodiments, a central axis of each the turboshaft gas turbine engines is non-parallel to the axis of rotation of the fan rotors.

In another embodiment according to any of the previous embodiments, an axis of the first intermediate drive shafts is also non-parallel to an axis of rotation of the fan.

In another embodiment according to any of the previous embodiments, an axis of the first intermediate drive shafts is also non-parallel to an axis of rotation of the fan.

In another embodiment according to any of the previous embodiments, the first intermediate drive shafts each extend to an output gear which engages a gear on the intermediate fan drive shaft, with the output gear on one of the first intermediate drive shafts extending to a position spaced rearwardly relative to the output gear on a second of the first intermediate drive shafts.

In another embodiment according to any of the previous embodiments, the first intermediate drive shaft and the fan drive shaft extend parallel to an axis of rotation of the at least two fans.

In another embodiment according to any of the previous embodiments, the intermediate fan drive shaft extends perpendicularly to the axis of rotation of the at least two fans.

In another embodiment according to any of the previous embodiments, a central axis of each the turboshaft gas turbine engine is parallel to an axis of rotation of the at least two fans.

In another embodiment according to any of the previous embodiments, a central axis of each the turboshaft gas turbine engines is non-parallel to the axis of rotation of the fan rotors.

In another embodiment according to any of the previous embodiments, an axis of the first intermediate drive shafts is also non-parallel to an axis of rotation of the fan.

In another embodiment according to any of the previous embodiments, an axis of the first intermediate drive shafts is also non-parallel to an axis of rotation of the fan.

In another embodiment according to any of the previous embodiments, the first intermediate drive shafts each extend to an output gear which engages a gear on the intermediate fan drive shaft, with the output gear on one of the first intermediate drive shafts extending to a position spaced rearwardly relative to the output gear on a second of the first intermediate drive shafts.

In another embodiment according to any of the previous embodiments, the first intermediate drive shafts each extend to an output gear which engages a gear on the intermediate fan drive shaft, with the output gear on one of the first intermediate drive shafts extending to a position spaced rearwardly relative to the output gear on a second of the first intermediate drive shafts.

These and other features may be best understood from the following drawings and specification.

DETAILED DESCRIPTION

Figure 1:
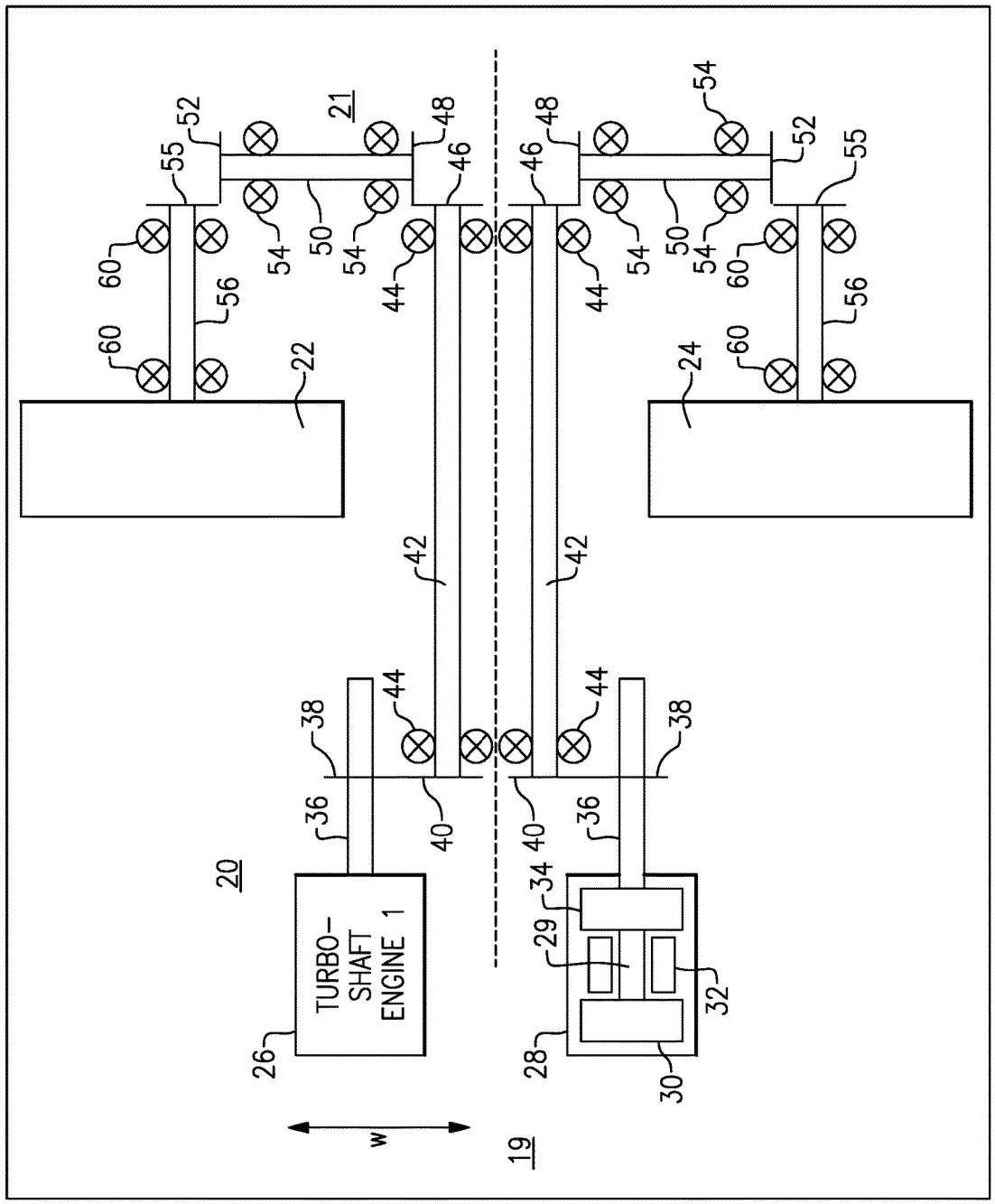
FIG. 1 schematically shows an aircraft propulsion system.

An aircraft 20 is shown having a forward location 19 and a rearward location 21. All of the structure illustrated in FIG. 1 may be generally found in the tail portion of the aircraft 20, however, items 19 and 21 give perspective for the relative direction. In addition, a width W is illustrated across the aircraft 20.

Two large fans 22 and 24 are shown and provide propulsion for the aircraft 20. The fan 22 is driven by a turboshaft engine 26 and the fan 24 is driven by a turboshaft engine 28. Each engine 26 and 28 includes a compressor section 30, a combustor 32, and a turbine section 34.

The turbine section 34 drives a shaft 29 to, in turn, drive the compressor 30. The turbine section 34 also drives a shaft 36 which drives a gear 38. Shafts 36 extend rearwardly from the engines. Gears 38 engage gears 40 each driving separate shafts 42, which are mounted in bearings 44. Shafts 42 drive a gear 46 which engages a gear 48. Each gear 48 drives shafts 50, which are mounted in bearings 54. The shafts 50, in turn, drive gears 52. Gears 52 drive gears 55 and thus shafts 56. Shafts 56, in turn, drive fan rotors in both fans 22 and 24. In addition, shafts 56 are mounted in bearings 60.

As can be appreciated, the shafts 42 extends from the engines 26 and 28 generally along an axial direction between locations 19 and 21. As shown in this Figure, the shafts 36 and 42 extend generally parallel to a forward direction along the aircraft or a rational axis of fans 22 and 24. The shafts 50 are perpendicular to the shafts 42 and the shafts 56 are parallel to the shafts 42.

More generally, it could be said the shafts 36 and 42 extend along the axial dimension for a greater distance than they do along the width dimension. The same is true for the shafts 56. On the other hand, the shafts 50 could be said to extend along a greater distance in the width dimension than they do in the axial dimension.

One could say the system includes at least two first intermediate drive shafts 42 extending over a distance that is greater in an axial dimension, defined between the turboshaft gas turbine engine 26/28 and the fan 22/24, than it is in a width dimension defined between the at least two fans 22/24.

Figure 2:
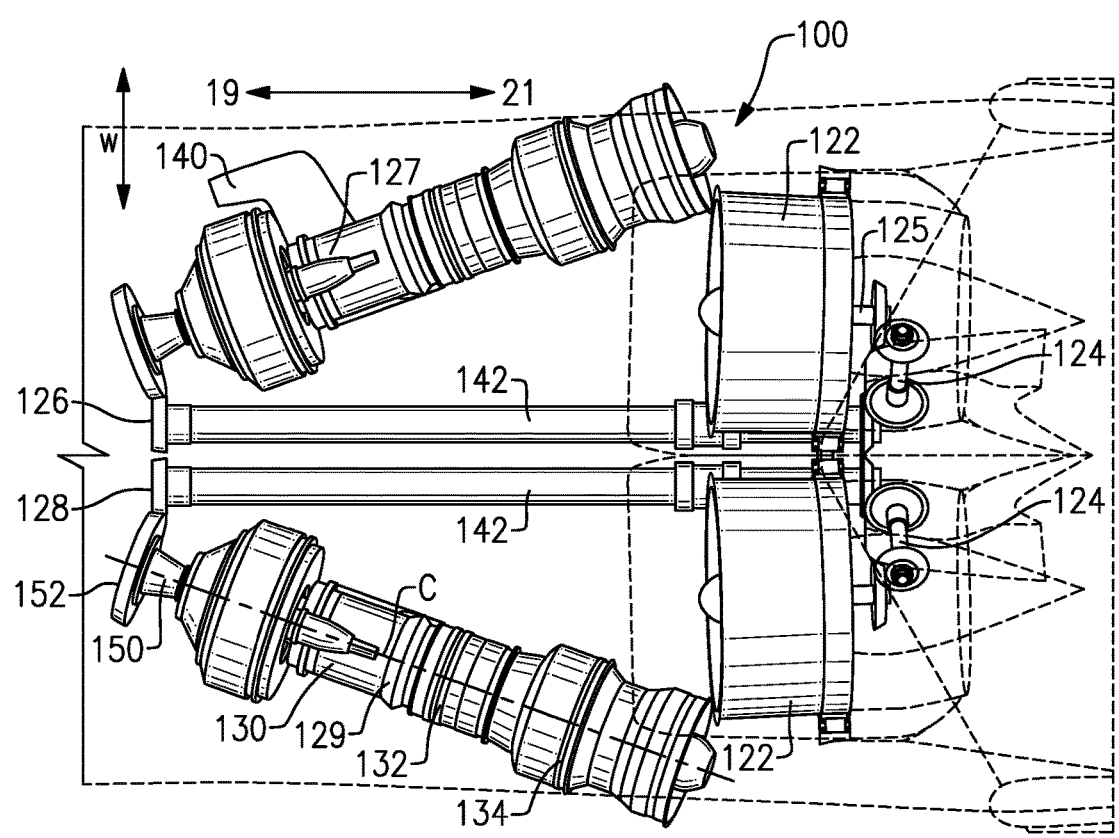
FIG. 2 shows a second embodiment.

FIG. 2 shows an alternative embodiment 100 wherein the fans 122 are driven through shafts 125, driven by shafts 124. The shafts 124 are driven by shafts 142. The shafts 142 are driven through gears 126 and 128. The gear 126 is driven by a gear associated with an engine 127. Gear 128 is driven by an engine 129 through gear 152. The gear 152 is driven by a shaft 150. The shaft 150 is driven with a compressor section 130 driven by a turbine 134. As can be appreciated, an exhaust of the engines in each of FIGS. 1 and 2 is generally in a rearward direction to provide additional propulsion. A combustor section 132 would be found in each engine 127 and 129, similar to the FIG. 1 embodiment.

In this embodiment, the gear 152 is at a forward end of the engines, and a scoop duct may be provided to provide air to the compressor 130. That is, this is shown schematically at 140. It should be understood that each engine would have such a structure.

In the embodiment 100, the shafts 142 extend parallel to the centerline and are parallel with an axis of rotation of the fans 122. However, a central axis of the engines 127 and 129 is non-parallel to the axis of rotation of the fans 122. It could still be said that the engine extends along a greater distance in an axial dimension than it does in a width dimension, however, by angling the engines better packaging may be achieved depending on the challenges of a particular application.

The turboshaft gas turbine engine drive shaft 150 extends from the turboshaft gas turbine engine in a forward direction to drive the gear 154 and, in turn, drives the drive shaft 142.

Figure 3:
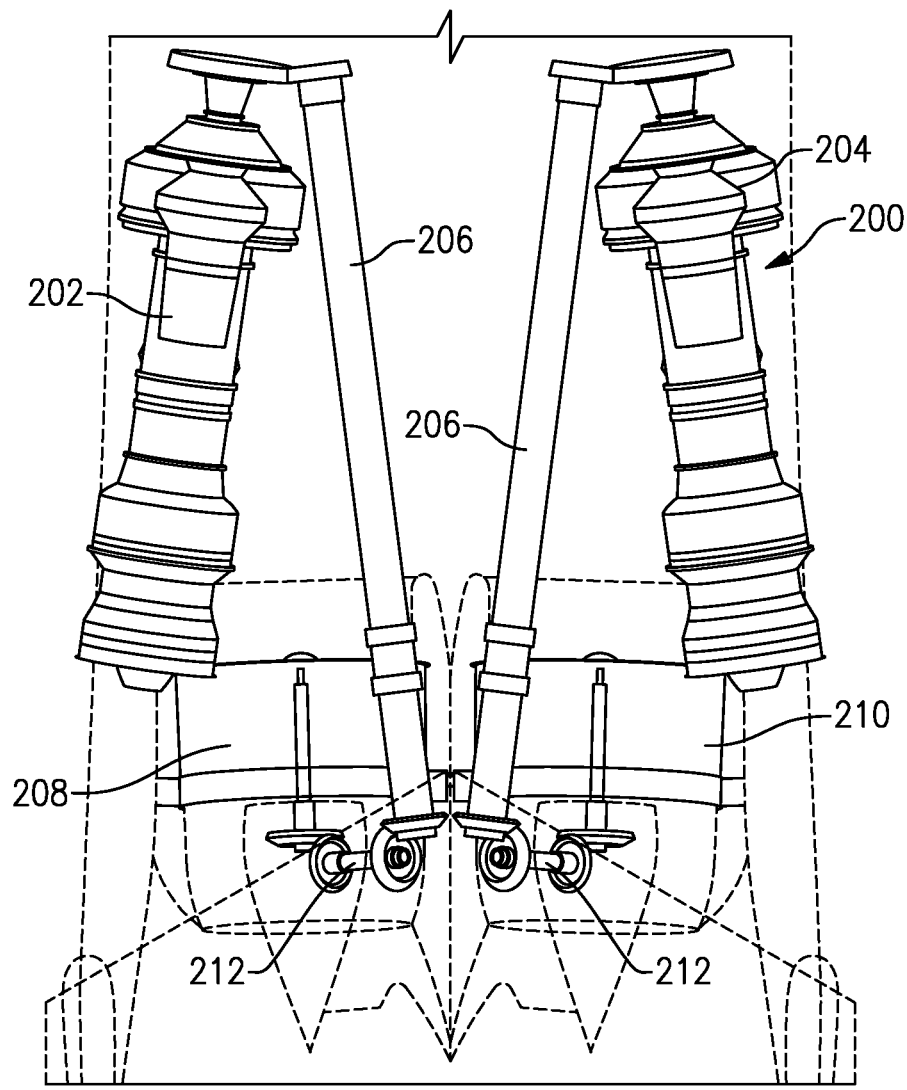
FIG. 3 shows yet another embodiment.

FIG. 3 shows an embodiment 200, wherein the engines 202 and 204 are again at an angle relative to the central axis. The shafts 206 are also now at an angle (non-parallel to a drive axis of the fans 208/210) and drive the fans 208 and 210 through intermediate shafts 212. Again, by angling the shafts, better packaging may be achieved for a particular aircraft application.

Figure 4:
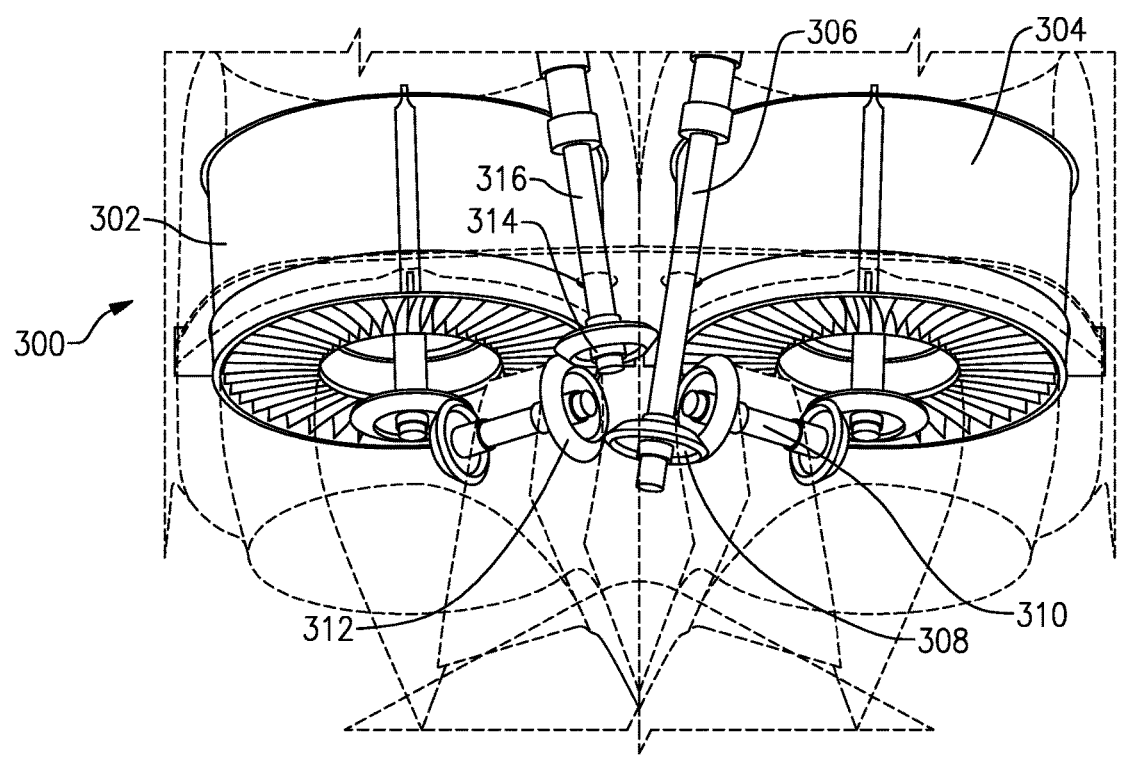
FIG. 4 shows yet another embodiment.

FIG. 4 shows yet another embodiment 300. In embodiment 300, a fan 304 is driven through a shaft 306 which drives a gear 308 to, in turn, drive a shaft 310. The engine 302 is driven through a shaft 316 having a gear 314 driving a shaft 312. As can be appreciated from this figure, the gear 308 is at a rearward location relative to the gear 314. Once again, better packaging may be achieved with such an embodiment. As can also be appreciated, the shafts 306 and 316 in this embodiment are not parallel to a rotational axis of the fans 302 and 304.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A propulsion system for an aircraft comprising:
at least two fans, each of said two fans having a fan drive shaft; and
a pair of turboshaft gas turbine engines for driving respective ones of said at least two fans, said turboshaft gas turbine engines each driving an output shaft which drives a gear to, in turn, drive a gear on a first intermediate each drive shaft extending from end said turboshaft gas turbine engine in a rearward direction toward an intermediate fan drive shaft, said intermediate fan drive shaft driving said fan drive shaft, and said at least two first intermediate drive shafts extending over a distance that is greater in an axial dimension defined between respective ones of said turboshaft gas turbine engines and said fans than it is in a width dimension defined between said at least two fans.

2. The propulsion system as set forth in claim 1, wherein said output shafts extend from said turboshaft gas turbine engines in a rearward direction to drive said first intermediate drive shafts.

3. The propulsion system as set forth in claim 1, wherein said output shafts extend from said turboshaft gas turbine engines in a forward direction to drive said gear and, in turn, drive said first intermediate drive shafts.

4. The propulsion system as set forth in claim 1, wherein said intermediate fan drive shafts extend for a greater distance in the width dimension than in said axial direction and said fan drive shaft extending for a greater distance in said axial direction than in said width direction.

5. The propulsion system as set forth in claim 4, wherein said first intermediate drive shaft and said fan drive shaft extend parallel to an axis of rotation of said at least two fans.

6. The propulsion system as set forth in claim 5, wherein said intermediate fan drive shaft extend perpendicularly to said axis of rotation of said at least two fans.

7. The propulsion system as set forth in claim 6, wherein a central axis of each said turboshaft gas turbine engine is parallel to an axis of rotation of said at least two fans.

8. The propulsion system as set forth in claim 6, wherein a central axis of each said turboshaft gas turbine engines is non-parallel to said axis of rotation of said fan rotors.

9. The propulsion system as set forth in claim 4, wherein a central axis of each said turboshaft gas turbine engines is non-parallel to said axis of rotation of said fan rotors.

10. The propulsion system as set forth in claim 9, wherein an axis of each said first intermediate drive shafts is also non-parallel to an axis of rotation of said fan.

11. The propulsion system as set forth in claim 4 wherein an axis of each said first intermediate drive shafts is also non-parallel to an axis of rotation of said fan.

12. The propulsion system as set forth in claim 4, wherein said first intermediate drive shafts each extend to an output gear which each engage a gear on said intermediate fan drive shaft, with said output gear on one of said first intermediate drive shafts extending to a position spaced rearwardly relative to said output gear on a second of said first intermediate drive shafts.

13. The propulsion system as set forth in claim 1, wherein said first intermediate drive and said fan drive shafts extend parallel to an axis of rotation of said at least two fans.

14. The propulsion system as set forth in claim 1, wherein said intermediate fan drive shafts extends perpendicularly to said axis of rotation of said at least two fans.

15. The propulsion system as set forth in claim 1, wherein a central axis of each said turboshaft gas turbine engine is parallel to an axis of rotation of said at least two fans.

16. The propulsion system as set forth in claim 1, wherein a central axis of each said turboshaft gas turbine engines is non-parallel to said axis of rotation of said fan rotors.

17. The propulsion system as set forth in claim 16, wherein an axis of said first intermediate drive shafts is also non-parallel to an axis of rotation of said fan.

18. The propulsion system as set forth in claim 1, wherein an axis of said first intermediate drive shafts is also non-parallel to an axis of rotation of said fan.

19. The propulsion system as set forth in claim 18, wherein said first intermediate drive shafts each extend to an output gear which engages a gear on said intermediate fan drive shaft, with said output gear on one of said first intermediate drive shafts extending to a position spaced rearwardly relative to said output gear on a second of said first intermediate drive shafts.

20. The propulsion system as set forth in claim 1, wherein said first intermediate drive shafts each extend to an output gear which each engages a gear on said intermediate fan drive shaft, with said output gear on one of said first intermediate drive shafts extending to a position spaced rearwardly relative to said output gear on a second of said first intermediate drive shafts.

* * * * *